US006568097B2

(12) United States Patent
Eckard

(10) Patent No.: US 6,568,097 B2
(45) Date of Patent: May 27, 2003

(54) SPRAY NOZZLE ADJUSTMENT TOOL AND METHOD

(75) Inventor: Blake Edward Eckard, Asheville, NC (US)

(73) Assignee: SPX Corporation, Muskegon, MI (US)

(*) Notice: Subject to any disclaimer, the term of this patent is extended or adjusted under 35 U.S.C. 154(b) by 0 days.

(21) Appl. No.: 09/934,528

(22) Filed: Aug. 23, 2001

(65) Prior Publication Data

US 2003/0037452 A1 Feb. 27, 2003

(51) Int. Cl.[7] .................................... G01D 21/00
(52) U.S. Cl. .................... 33/626; 33/645; 239/289
(58) Field of Search .................... 33/626, 1 N, 471, 33/534, 613, 645, 562, 533, 334; 239/289

(56) References Cited

U.S. PATENT DOCUMENTS 4,986,002 A * 1/1991 Oros et al. .................... 33/334
5,251,820 A * 10/1993 Ho .................... 239/289
5,263,492 A * 11/1993 Voyce .................... 33/471

* cited by examiner

*Primary Examiner*—Christopher W. Fulton
(74) *Attorney, Agent, or Firm*—Baker & Hostetler, LLP

(57) ABSTRACT

A tool and method for adjusting the direction of a spray nozzle is provided. The tool and method provide a way to angular the direction of a spray nozzle, and also to record and rest angular direction of a spray nozzle when the angle is changed in use. The tool includes a tool body having an aperture through the body sized to fit over a fixed part of the nozzle and an indicator arm pivotally mounted to the tool housing body that can be aligned with the angle the moveable part of the nozzle. To record the angular position of the nozzle, the tool can be placed on the tool body and the indicator arm can be positioned at an angle that corresponds to the angle of the nozzle. To adjust the angle of the nozzle, the indicator arm can be positioned at a predetermined angle, and the nozzle can be aligned with the indicator arm.

15 Claims, 3 Drawing Sheets

SPRAY NOZZLE ADJUSTMENT TOOL AND METHOD

FIELD OF THE INVENTION

The present invention relates generally to the adjustment of spray nozzles. More particularly, the present invention relates to a tool and method for angular positioning of spray nozzles that are moveable in angular directions. The invention is useful, for example, to adjust spray nozzles used in a chemical wash pretreatment system.

BACKGROUND OF THE INVENTION

It is known in the treatment of various parts and assemblies to spray treat the parts by spraying them in a wash bath with various agents. For example, it is known to provide a rectangular spray wash room having a washing stage with hooks and/or conveyors upon which parts can be supported during the spraying process. Such a room might be over one-hundred feet long and include a dozen or more riser pipes on either side of the washing stage, each having four or five spray nozzles vertically arranged along the riser pipe to spray the parts.

The parts may be simply loaded into the room for treatment, and then removed, or they may be conveyed through the room by a horizontal conveyor arrangement. The riser tubes may be provided along the washing stage on two or four sides of the wash stage. In addition, top and/or bottom horizontal riser tubes may also be provided above and/or below the parts, with nozzles spaced along the horizontal tubes to spray upward and/or downwardly onto the parts.

It is known for each nozzle to include a nozzle body that is clamped onto the riser tube with an inlet port that is sealed against a hole provided in the riser tube. The spray nozzle can have a spray outlet aperture that is circular or oval in shape, to provide a predetermined spray pattern that may be either circular or have an elongated oval shape.

It is also known for the spray nozzles to have a moveable nozzle portion mounted in a fixed housing such that they are angularly adjustable in one or two planes. Also, if the nozzle output aperture is an oval to form a elongated spray pattern, it is possible to rotate the axis of elongation about the central axis of the outlet aperture. Accordingly, in the case of a nozzle that is mounted to spray horizontally from a vertical riser tube, it is known to have a nozzle whose spray direction can be adjusted vertically and/or horizontally, and to have the longitudinal axis of the oval aperture be adjustable about the central spray axis.

Depending on the size shape and number of parts to be sprayed, as well as other factors, in different applications it is desirable to adjust each of these spray angles. It is also desirable to have a way to record and reset these angles when the angles are changed in use. For example, if parts of one type are to be treated, it would be desirable to set an appropriate spray pattern for those parts, and then to be able to change to a different spray pattern for other parts, and still next be able to return to the first previous settings when the first type of parts are again treated.

One way of adjusting the angles is for there to be a threaded cap nut which retains the movable portion of the nozzle. The user loosens the cap nut and position the nozzle as desired, and then tightens the cap nut in order to secure the nozzle at the desired angle.

A disadvantage of the presently known arrangement is that the adjustment described above is performed entirely by hand, without any alignment or guiding tools. Therefore, the setting of the angle can be imprecise and require trial and error.

Accordingly, it is desirable to have a tool and method for adjusting the direction of a spray nozzle. It is also desirable to provide a way to record and reset these angles when the angles are changed in use.

SUMMARY OF THE INVENTION

It is therefore a feature and advantage of the present invention to provide a tool and method for adjusting the direction of a spray nozzle.

It is another feature and advantage of the present invention to provide a way to record and reset these angles when the angles are changed in use.

The above and other features and advantages are achieved through the use of a novel tool and method as herein disclosed. In accordance with one embodiment of the present invention, a tool is provided for measuring and/or adjusting the angular position of a moveable nozzle having a moveable nozzle part and a fixed nozzle body. The tool comprises a tool body having an aperture therethrough sized to fit over the fixed nozzle part, and an indicator arm pivotally mounted to the tool housing body.

In accordance with another embodiment of the present invention, the tool comprises a tool body having an aperture therethrough to size to fit over the fixed nozzle part, and indicator means for indicating an angle relative to the tool housing body.

In accordance with still another embodiment of the present invention, a method is provided for recording the angular position of a moveable nozzle that is moveable within a fixed nozzle body. The method comprises the steps of placing a tool having a tool body with an aperture sized to surround the fixed nozzle body onto the fixed nozzle body, and positioning an indicator arm that is pivotally mounted to the tool body at an angle that corresponds to the angle of the moveable nozzle portion. The method also comprises the step of reading the angle of the indicator arm relative to the tool body.

In accordance with yet another embodiment of the present invention, a method is provided of adjusting the position of a moveable nozzle portion that is moveable within a fixed nozzle body. The method comprises the steps of positioning an indicator arm at a desired angle relative to a tool body, placing the tool body over the fixed nozzle portion, and aligning the moveable portion with the indicator arm. The steps of positioning and placing can be performed in any order.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides a nozzle tool that is useful to facilitate the positioning of the spray direction of a nozzle that is moveable about at least one axis. A tool and method for adjusting the direction of a spray nozzle is provided. The tool and method provide a way to angular the direction of a spray nozzle, and also to record and rest angular direction of a spray nozzle when the angle is changed in use. The tool includes a tool body having an aperture through the body sized to fit over a fixed part of the nozzle and an indicator arm pivotally mounted to the tool housing body that can be aligned with the angle the moveable part of the nozzle. To record the angular position of the nozzle, the tool can be placed on the tool body and the indicator arm can be positioned at an angle that corresponds to the angle of the nozzle. To adjust the angle of the nozzle, the indicator arm can be positioned at a predetermined angle, and the nozzle can be aligned with the indicator arm.

Figure 1:
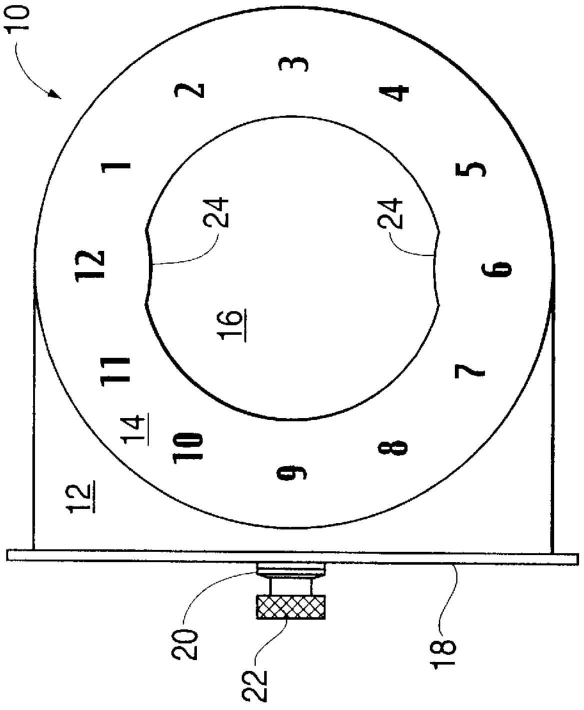
FIG. 1 is a front view of a nozzle adjustment tool according to a preferred embodiment of the present invention.

FIG. 1 illustrates a preferred embodiment of a nozzle tool 10, including a body 12 which may be provided by a block of plastic or other suitable material. The body 12 has on its front surface a face plate 14, which can have directional markings such as, for example, the clock face illustrated. The clock face surrounds a central aperture 16 that passes through the body 12, which is for receiving the nozzle as described in more detail herein.

Figure 2:
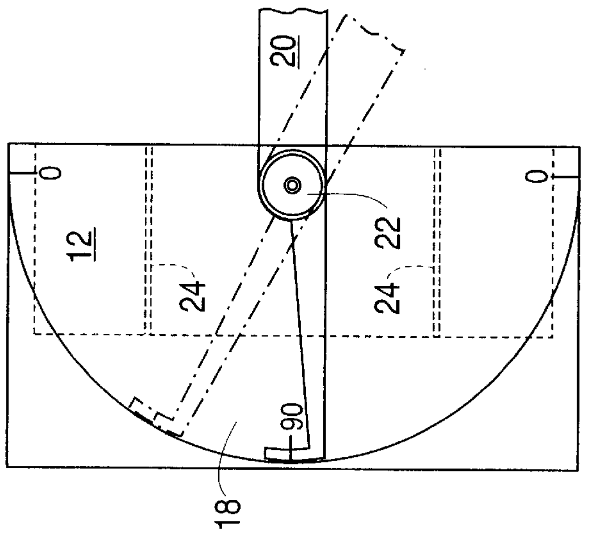
FIG. 2 is a side view of the nozzle adjustment tool depicted in FIG. 1.

A protractor plate 18 is mounted against one side of the body 12 as illustrated in FIGS. 1 and 2. The protractor plate 18 has graduated markings, such as for example protractor markings spanning 180 degrees. Markings might also be measured from any reference point and thus indicate degrees such as 90 degrees off a central reference.

As further seen in FIGS. 1 and 2, an indicator arm 20 is pivotally mounted to the side of the body 12 by a threaded knob 22. The indicator arm 20 has two ends and can pivot as indicated by the phantom lines in FIG. 2. Accordingly, the user can move the indicator arm 20 around the axis of the knob 22, and the end of the indicator arm adjacent the protractor plate 18 will indicate an angular position of the indicator arm 20.

Figure 3:
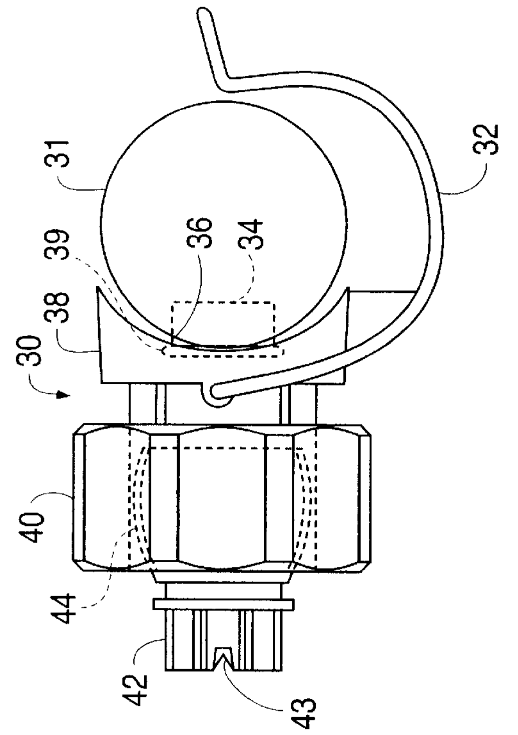
FIG. 3 is a top view of a nozzle assembly installed on a riser tube.

FIG. 3 illustrates an exemplary conventional nozzle assembly 30 with which the invention can be used. The nozzle assembly 30 is illustrated secured onto a riser pipe 31. The riser pipe 31 provides fluid under pressure that is to be sprayed through the nozzle assembly 30. A clip 32 is pivotally mounted to the nozzle assembly 30 to fasten it against the riser pipe 31. A port 34 in the nozzle assembly 30 receives fluid through a hole provided in the pipe 36. Nozzle assembly 30 includes a body element 38 that has the inlet port 34, and an o-ring 39 can be provided to seal the body 38 against the riser pipe 30.

A threaded cap nut 40 can be screwed onto the body 38 to trap a pivoting nozzle element 42 therein. Pivoting nozzle element 42 has an inlet end to receive fluid from the port 34, and the pivoting nozzle element 42 also has an elongated outlet opening 43 through which the fluid is sprayed. The nozzle element 42 has a spherical outer surface 44, which corresponds in shape to a spherical support surface 46 in the body, so that when the cap nut 40 is loosened the nozzle element 42 is free to move with three degrees of freedom of motion. First, the nozzle can pivot about the vertical axis (direction A in FIG. 6). Second, the nozzle can pivot about the horizontal axis (direction B in FIG. 4). Third, the nozzle can be rotated about its own central axis (direction C in FIG. 5). When the cap nut 40 is tightened, the nozzle is retained in the directional position in which it is placed.

Figure 4:
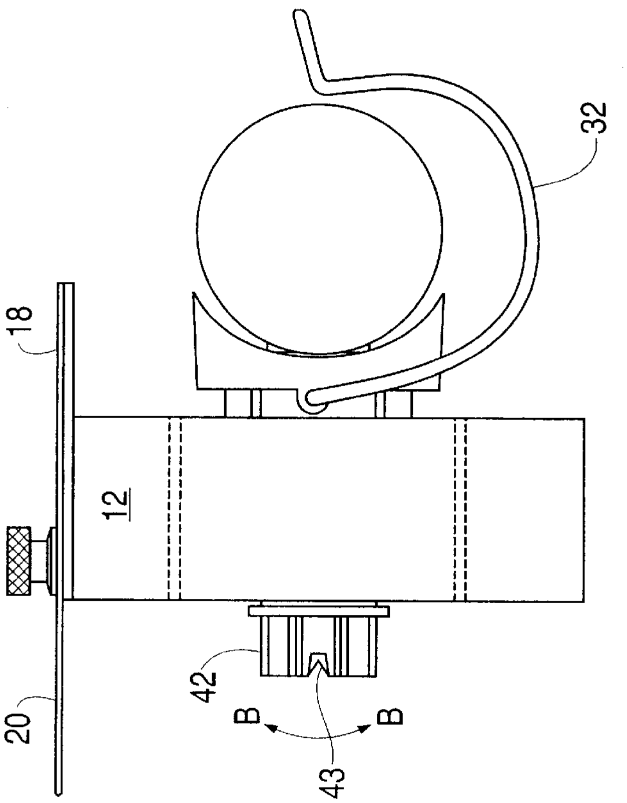
FIG. 4 is a top view of a nozzle tool according to the present invention inserted over a nozzle assembly as illustrated and mounted as shown in FIG. 3.
Figure 6:
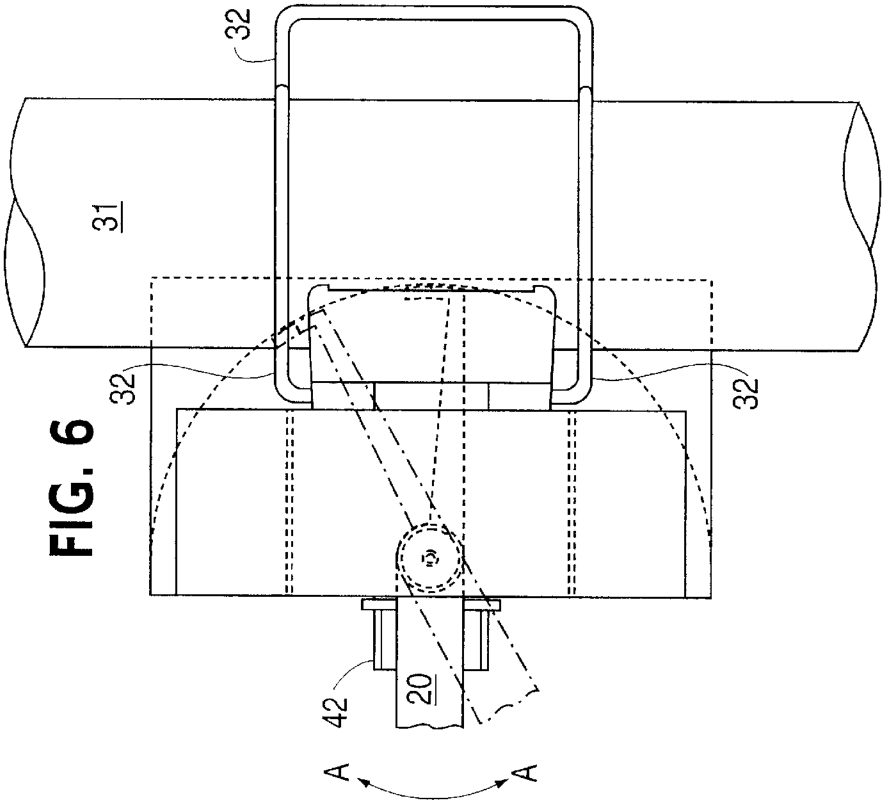
FIG. 6 is a side view of a nozzle tool positioned over a nozzle assembly as tool positioned as in FIGS. 4 and 5, and illustrating the opposite side of the nozzle tool from that illustrated in FIG. 2.
Figure 5:
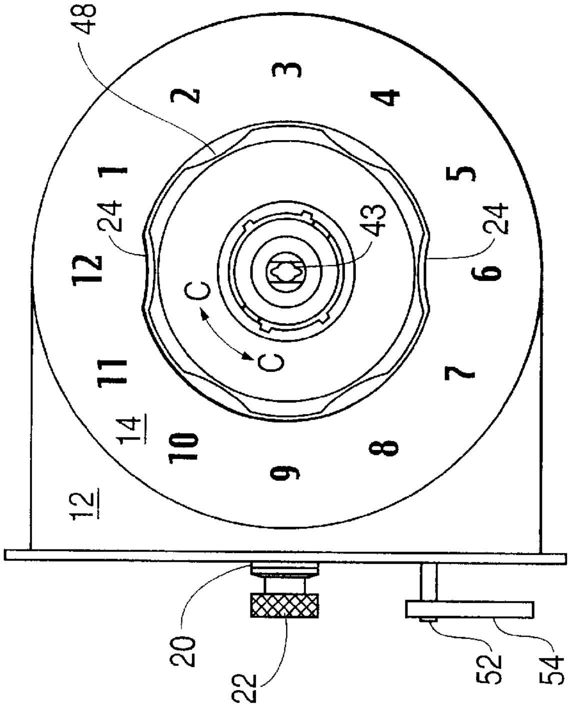
FIG. 5 is a front view of a nozzle tool positioned over a nozzle assembly as in FIG. 4.

FIGS. 4, 5 and 6 illustrate the tool 10 of the present invention after it has been slid over a nozzle assembly 30 mounted as in FIG. 3. The tool 10 can be used as follows.

Initially, the user slides the tool 10 over the cap nut 40 of the nozzle 30. Projections 24 on the inner surface of the aperture 16 will engage with dimples 48 on the circumference on the cap nut 40. In this initial insertion stage, the cap nut 40 should be only very slightly loosened, so that the nozzle portion 42, which is extending outward as shown, can be positioned by hand against frictional resistance.

The user can now make several adjustments in any order. One adjustment that the user can make, as best seen in FIG. 6, is to position the nozzle spray direction vertically. In the example of FIG. 6, the riser tube 30 is a vertical riser tube, and the nozzle element 42 can be adjusted to adjust the spray pattern up and down (in direction A). If a known vertical angle is desired, the user may set the indicator arm 20 at the desired angle and tighten the knob 22 so that the arm is fixed at ascertain direction. In FIG. 6, the protractor arm is shown secured in a purely horizontal direction. Then, the user can align the nozzle 42 by aligning its top and bottom edges with the top and bottom edges of the indicator arm 20. The indicator arm 20 can also be used to record a position. That is, if the nozzle 42 is positioned in a direction to be recorded, the user can align the indicator arm 20 with the position of the nozzle 42, and then read the angle off the protractor scale 18 to be recorded for future use.

The example given in FIG. 6 shows the tool 10 being placed onto the nozzle for a vertical adjustment. However, the tool can be positioned at other orientations onto the knob and therefore could be used, for example, for a horizontal adjustment, using the indicator arm 20 and protractor plate 18 in the same manner described above. In this way, tool can be used to define either of two degrees of motion of the nozzle or any combination of those directions.

The tool 10 is also provided with the clock face 14 as shown. The clock face 14 provides two functions. First, in the case of a nozzle assembly 30 having an elongated oval aperture 43 as shown, the longitudinal axis of the oval aperture 43 can be rotated about its central axis, using the clock face. For example, in the illustration of FIG. 5, the axis extends from twelve o'clock to six o'clock. In the case of a vertical rise tube 31 and a tool 10 positioned as in FIG. 6, this would indicate a vertical spray pattern. However, by manually manipulating the nozzle 42, it can be rotated so that the longitudinal axis extends at other angles, for example from one o'clock to seven o'clock.

The clock face 14 also provides a frame of reference or a compass for angular directional adjustments. For example, in using the description of FIG. 6, twelve o'clock refers to an upward direction and six o'clock to a downward direction. Three o'clock and nine o'clock would refer to horizontal directions. The clock face 14 thus provides a convenience in describing a direction for the nozzle to be oriented.

An optional feature of the preferred embodiment, is that a bracket 52 may be provided as shown in FIG. 5 to support a pin 54. The pin 54 can be inserted into the aperture 43 of the nozzle, to serve as a lever for moving the nozzle 42 in any of the various directions described above. In the case of using the pin 54 to position the nozzle, the pin 54 is placed onto the nozzle aperture 43 as described above and the nozzle 42 is manipulated into the desired position.

When the nozzle 42 is in the desired position, the pin 54 can be removed from the nozzle aperture 43 and the nut 40 can be hand tightened. Alternatively, since the tool 10 has projections 24 that engage dimples 48 in the nut 40, the nut 40 can be tightened simply by rotating the tool 10 when the tool 10 is on the nut 40.

Thus, the present invention can provide a simple and convenient operation whererbythe user may place the tool 10 onto the nozzle assembly 30, position the nozzle 42 by reference to the indicator arm 20 when may be fixed at a preset angle, and then quickly tightening the nut 40 by a slight rotation of the tool 10. Then, the tool 10 can be slid off the tightened nozzle assembly 30.

Although one example described above involves a vertically oriented riser tube, and illustrates vertical angular positioning of the nozzle, it will be appreciated that the invention may be used with nozzles mounted on tubes on any angle, including horizontal or otherwise angled riser tubes and nozzle assemblies. Further, the tool 10 can be positioned on the nozzle at different circumferential angles, and therefore the protractor and arm can be used to position the nozzle in any direction relative to the riser tube.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool for measuring and/or adjusting the angular position of a moveable nozzle having a moveable part and a fixed nozzle body, the tool comprising:

a tool body having an aperture therethrough sized to fit over the fixed nozzle part;

an indicator arm pivotally mounted to the tool housing body; and a circular clock face indication extending around the periphery of the aperture on the tool body.

2. A tool according to claim 1, further comprising graduated markings on the tool housing body.

3. A tool according to claim 2, wherein the indicator arm is an elongated indicator arm pivotally mounted to the body, and having a first end adjacent the graduated markings, and an opposed second end extending beyond the tool housing body.

4. A tool according to claim 3, further comprising a locking device for selectively locking the indicator arm in a selected position.

5. A tool according to claim 4, wherein the locking device comprises a knob that can be tightened against the indicator arm to lock the indicator arm in a selected position.

6. A tool for measuring and/or adjusting the angular position of a moveable nozzle having a moveable nozzle part and a fixed nozzle body, the tool comprising:

A tool body having an aperture therethrough sized to fit over the fixed nozzle part;

indicator means for indicating an angle relative to the tool housing body; and a circular clock face indication extending around the periphery of the aperture on the tool body.

7. A tool according to claim 6, further comprising graduated markings on the tool housing body.

8. A tool according to claim 7, wherein the indicator means comprises elongated indicator arm pivotally mounted to the body, and having a first end adjacent the graduated markings, and an opposed second end extending beyond the tool housing body.

9. A tool according to claim 6, further comprising a locking means for selectively locking the indicator means in a selected angles.

10. A tool according to claim 9, wherein the locking means comprises a knob that can be tightened against the indicator means to lock the indicator means in a selected position.

11. A method for recording the angular position of a movable nozzle that is moveable within a fixed nozzle body, the method comprising the steps of:

placing a tool having a tool body with an aperture sized to surround the fixed nozzle body onto the fixed nozzle body;

positioning an indicator arm that is pivotally mounted to the tool body at an angle that corresponds to the angle of the moveable nozzle portion;

reading the angel of the indicator arm relative to the tool body;

the step of removing the tool from the fixed nozzle position; and the step of reading an angle of orientation of an elongated portion of the moveable nozzle by comparison with a clock face graduation marked around the circumference of the aperture in the tool housing body.

12. A method according to claim 11, further comprising the step of recording the angle indicated by the indicator arm.

13. A method according to claim 11, wherein the step of reading the angle includes the step of reading an indication on the end of the indicator arm against graduated markings on the tool body.

14. A method of adjusting the position of a moveable nozzle portion that is moveable within a fixed nozzle body, the method comprising the steps of:

positioning an indicator arm at a desired angle relative to a tool body having a tool body with an aperture sized to surround the fixed nozzle body onto the fixed nozzle body;

placing the tool body over the fixed nozzle portion; and aligning the moveable nozzle portion with the indicator arm wherein the steps of setting and positioning can be performed in any order, wherein the positioning step includes the step of reading an indication on the end of the indicator arm against graduated markings along the periphery of the aperture on the tool body.

15. A method according to claim 14, further comprising the step of removing the tool housing body from the fixed nozzle portion.

* * * * *